US012587435B2

(12) United States Patent
Song et al.

(10) Patent No.: US 12,587,435 B2
(45) Date of Patent: Mar. 24, 2026

(54) METHOD AND APPARATUS FOR DBNG-UP REDUNDANCY

(71) Applicant: ZTE Corporation, Shenzhen (CN)

(72) Inventors: Xueyan Song, Shenzhen (CN); Zhijun Li, Shenzhen (CN); Yong Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 67 days.

(21) Appl. No.: 18/579,840

(22) PCT Filed: Apr. 28, 2022

(86) PCT No.: PCT/CN2022/089970
§ 371 (c)(1),
(2) Date: Jan. 16, 2024

(87) PCT Pub. No.: WO2023/284367
PCT Pub. Date: Jan. 19, 2023

(65) Prior Publication Data
US 2024/0333582 A1      Oct. 3, 2024

(30) Foreign Application Priority Data

Jul. 16, 2021     (CN) .......................... 202110807933.1

(51) Int. Cl.
*H04L 41/0663* (2022.01)
*H04L 41/00* (2022.01)
*H04L 41/0823* (2022.01)

(52) U.S. Cl.
CPC ...... *H04L 41/0663* (2013.01); *H04L 41/0836* (2013.01); *H04L 41/32* (2013.01)

(58) Field of Classification Search
CPC ............. H04L 41/0654; H04L 41/0663; H04L 41/0836; H04L 41/32; H04L 41/0668; H04L 69/40; H04W 24/04
See application file for complete search history.

(56) References Cited

U.S. PATENT DOCUMENTS

2013/0250749 A1     9/2013   Morishige et al.
2017/0126436 A1     5/2017   Du et al.
(Continued)

FOREIGN PATENT DOCUMENTS

CN         107623593 A   *   1/2018   .........   H04L 41/0663
CN         108667575 A   *   10/2018   .........   H04L 41/0663
(Continued)

OTHER PUBLICATIONS

3GPP, "Interface between the Control Plane and the User Plane Nodes", 3GPP TS 29.244 V16.6.0, Dec. 2020, pp. 16, 60-61 and 106-129 (Year: 2020).*
(Continued)

*Primary Examiner* — Vivek Srivastava
*Assistant Examiner* — William C McBeth
(74) *Attorney, Agent, or Firm* — CANTOR COLBURN LLP

(57) ABSTRACT

The present disclosure provides a method and apparatus for DBNG-UP redundancy. The method includes: configuring a redundancy group instance on a DBNG-CP, wherein redundancy group members managed by the DBNG-CP at least include a first DBNG-UP and a second DBNG-UP; and performing, by the DBNG-CP, UP redundancy capability negotiation with the first DBNG-UP and the second DBNG-UP respectively, to complete active/standby election between the first DBNG-UP and the second DBNG-UP. In the present disclosure, a DBNG-CP performs UP redundancy capability negotiation with DBNG-UPs managed by
(Continued)

the DBNG-CP, so as to complete active/standby election of the DBNG-UP, thereby solving the problem of UP redundancy capability negotiation, and increasing the flexibility of DBNG-UP redundancy protection.

10 Claims, 3 Drawing Sheets

(56)                References Cited

U.S. PATENT DOCUMENTS

| | | | | |
|---|---|---|---|---|
| 2018/0210800 | A1* | 7/2018 | Guo | H04L 41/0836 |
| 2020/0145278 | A1 | 5/2020 | Ghadge et al. | |
| 2022/0255828 | A1* | 8/2022 | Li | H04L 41/0816 |
| 2022/0294855 | A1* | 9/2022 | Landais | H04L 67/141 |
| 2023/0122810 | A1* | 4/2023 | Niu | H04L 12/287 |
| | | | | 370/389 |
| 2023/0344702 | A1* | 10/2023 | Deng | H04L 41/0663 |

FOREIGN PATENT DOCUMENTS

| | | | | |
|---|---|---|---|---|
| CN | 111654384 | A | 9/2020 | |
| CN | 114363285 | A * | 4/2022 | H04L 61/5014 |

OTHER PUBLICATIONS

Figueiredo, Rubens, and Andreas Kassler. "Bng-hal: A unified api for disaggregated bngs." 2021 IEEE Conference on Network Function Virtualization and Software Defined Networks (NFV-SDN). IEEE, 2021. (Year: 2021).*

Rodrigues, Filipe, et al. "SMF Assisted Faster and Efficient Upf Redundancy Model", Technical Disclosure Commons, Aug. 27, 2020, <https://www.tdcommons.org/dpubs_series/3550> (Year: 2020).*

International Preliminary Report on Patentability for corresponding application PCT/CN2022/089970 filed Apr. 28, 2022; Mail date Jun. 30, 2022.

International Search Report for corresponding application PCT/CN2022/089970 filed Apr. 28, 2022; Mail date Jun. 30, 2022.

Written Opinion for corresponding application PCT/CN2022/089970 filed Apr. 28, 2022; Mail date Jun. 30, 2022.

Broadband Forum: "TR-459 Control and User Plane Separation for a disaggregated BNG", 3GPP Draft; C4-203064; 3rd Generated Partnership Project, May 14, 2020, XP052331094.

European Search Report for corresponding application EP22841008.0: Mail date Oct. 7, 2024.

* cited by examiner

Input/output device 108

Transmission device 106

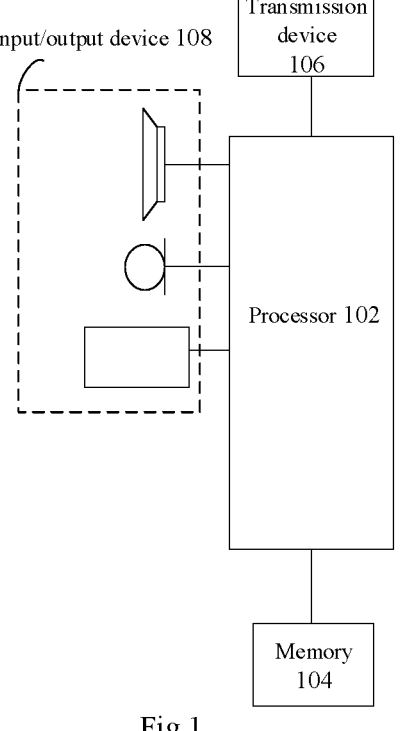

Processor 102

Memory 104

Fig.1

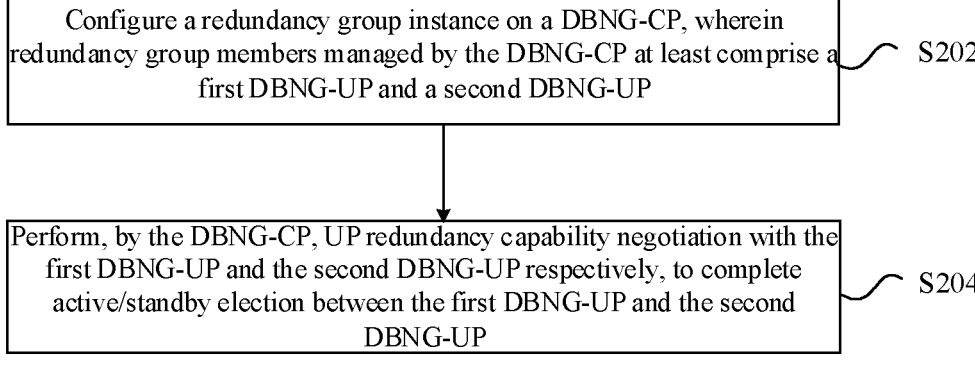

Configure a redundancy group instance on a DBNG-CP, wherein redundancy group members managed by the DBNG-CP at least comprise a first DBNG-UP and a second DBNG-UP          S202

Perform, by the DBNG-CP, UP redundancy capability negotiation with the first DBNG-UP and the second DBNG-UP respectively, to complete active/standby election between the first DBNG-UP and the second DBNG-UP          S204

Fig.2

METHOD AND APPARATUS FOR DBNG-UP REDUNDANCY

CROSS-REFERENCE TO RELATED DISCLOSURE

This disclosure is a national stage filing under 35 U.S.C. § 371 of international application number PCT/CN2022/089970, filed Apr. 28, 2022, which based upon and claims priority to Chinese Patent Disclosure No. 202110807933.1, filed on 16 Jul. 2021, the entire disclosure of which is incorporated herein by reference.

TECHNICAL FIELD

Embodiments of the present disclosure relate to the field of communications, and in particular, to a method and apparatus for Disaggregated Broadband Network Gateway-User Plane (DBNG-UP) redundancy.

BACKGROUND

A traditional metropolitan area network service gateway, i.e., a Broadband Access Server (BRAS) device, mainly achieves access control and management functions of fixed-line broadband users.

virtual Broadband Remote Access Server (vBRAS) with separation of forwarding and control achieves centralized management and traffic forwarding of fixed broadband users, thereby improving the utilization of device resources; moreover, redundancy is achieved through pooling of a forwarding plane and cloudification of a control plane, thereby improving the network reliability. Due to implementation by technologies such as load sharing and active/standby redundancy, the flexibility of service deployment and the reliability of service operation can be improved.

In order to achieve the operational reliability of DBNG-UPs, a plurality of DBNG-UPs managed by the same DBNG-CP may be put in the same pool by using a DBNG-UP pooling technology, and other DBNG-UPs may serve as redundancy of any one DBNG-UP. Moreover, by deploying double hot standby of the DBNG-UPs (including two cases of 1:1 redundancy and N:1 redundancy), when an active DBNG-UP fails, redundancy of the active DBNG-UP can also be achieved by DBNG-UP redundancy switching.

For example, by taking N:1 DBNG-UPs as a protection example. N UPs (DBNG-UP1, DBNG-UP2, . . . , DBNG-UPn) configured on a DBNG-CP are the same redundancy group instance. The redundancy group instance information may include: redundancy group members, priority of the redundancy group members, a switching policy and the like. Possible failure locations of the DBNG-UPs include: link communication between UP-ANs, link failure between CP-UPs, and node failure of the DBNG-UPs. For another example, N+1 UPs (DBNG-UP1, DBNG-UP2, . . . , DBNG-UPn, DBNG-UP(n+1)) are configured on a DBNG-UP in the same redundancy group instance; and by a user plane redundancy (UP Redundancy) algorithm, DBNG-UP1 to DBNG-UPn are elected as active UPs (Active), and DBNG-UP(n+1) is elected as a standby UP (Standby).

In order to support the operational reliability of the DBNG-UPs, a control plane interface protocol between the DBNG-CP and the DBNG-UPs needs to be used for support. BBF WT-459 specifies that a DBNG control plane interface protocol is achieved by using a Packet Forwarding Control Protocol (PFCP). However, for an important scenario of DBNG-UP protection, the WT-459 project has not provided standard specifications supported by a protocol yet.

SUMMARY

Embodiments of the present disclosure provide a DBNG-UP redundancy method and apparatus, so as to at least solve the problem in the related art of UP redundancy capability negotiation between a DBNG-CP and DBNG-UPs.

According to an embodiment of the present disclosure, provided is a method for DBNG-UP redundancy, includes: a redundancy group instance is configured on a DBNG-CP, wherein redundancy group members managed by the DBNG-CP at least include a first DBNG-UP and a second DBNG-UP; and the DBNG-CP performs UP redundancy capability negotiation with the first DBNG-UP and the second DBNG-UP respectively, to complete active/standby election between the first DBNG-UP and the second DBNG-UP.

In an exemplary embodiment, the step that a redundancy group instance is configured on a DBNG-CP, includes: a redundancy group instance is configured on the DBNG-CP, and redundancy group members are specified as the first DBNG-UP and the second DBNG-UP; and redundancy instances are deployed on the first DBNG-UP and the second DBNG-UP respectively, interfaces connecting the first DBNG-UP and the second DBNG-UP to a user access side are added, and redundancy capabilities of the first DBNG-UP and the second DBNG-UP are enabled.

In an exemplary embodiment, the step that the DBNG-CP performs UP redundancy capability negotiation with the first DBNG-UP and the second DBNG-UP respectively, to complete active/standby election between the first DBNG-UP and the second DBNG-UP, includes: the DBNG-CP performs redundancy capability negotiation with the first DBNG-UP and the second DBNG-UP respectively by a control plane interface protocol, and performs active/standby specifying on the first DBNG-UP and the second DBNG-UP, wherein the first DBNG-UP is an active DBNG-UP and the second DBNG-UP is a standby DBNG-UP.

In an exemplary embodiment, an information element of a Packet Forwarding Control Protocol (PFCP) negotiation message is extended, so as to support UP redundancy capability negotiation between the DBNG-CP and the first DBNG-UP and the second DBNG-UP, and to support active/standby specifying of the first DBNG-UP and the second DBNG-UP by the DBNG-CP.

In an exemplary embodiment, the step that an information element of a PFCP association message is extended includes: an UP redundancy group identifier information element is added to the PFCP association message.

In an exemplary embodiment, after completing the active/standby election between the first DBNG-UP and the second DBNG-UP, the method further includes: in cases where a user plane interface failure occurs in the first DBNG-UP, the DBNG-CP receives failure information reported by the first DBNG-UP, triggers protection switching of redundancy group members, and notifies status information of the redundancy group members.

In an exemplary embodiment, a PFCP node reporting mechanism is used to report the failure information of the first DBNG-UP, and to notify the status information of the redundancy group members.

In an exemplary embodiment, the failure information of the first DBNG-UP is reported by a PFCP node report request message, and the status information of the redundancy group members is notified by a PFCP node report response message.

In an exemplary embodiment, an information element of the PFCP node report request message is extended to carry the failure information of the first DBNG-UP, and an information element of the PFCP node report response message is extended to carry the status information of the redundancy group members.

In an exemplary embodiment, the step that an information element of the PFCP node report request message is extended to carry the failure information of the first DBNG-UP includes: the failure information of the first DBNG-UP is carried by an extended user plane interface failure information element.

In an exemplary embodiment, the step that an information element of the PFCP node report response message is extended to carry the status information of the redundancy group members, includes: the status information of the redundancy group members is carried by a newly-added user plane redundancy group member status information element.

According to another embodiment of the present disclosure, provided is an apparatus for DBNG-UP redundancy, includes: a configuration module, configured to configure a redundancy group instance on a DBNG-CP, wherein redundancy group members managed by the DBNG-CP at least include a first DBNG-UP and a second DBNG-UP; and an negotiation module, configured to perform, by the DBNG-CP, UP redundancy capability negotiation with the first DBNG-UP and the second DBNG-UP respectively, to complete active/standby election between the first DBNG-UP and the second DBNG-UP.

In an exemplary embodiment, the apparatus can further include: a mapping module, configured to establish, on the DBNG-CP, a mapping from protection interfaces of the first DBNG-UP and the second DBNG-UP to the DBNG-CP.

According to another embodiment of the present disclosure, further provided is a computer readable storage medium, the computer readable storage medium storing a computer program, wherein the computer program is configured to execute, when running, the steps in any one of the method embodiments above.

According to another embodiment of the present disclosure, further provided is an electronic apparatus, includes a memory and a processor; wherein the memory stores a computer program, and the processor is configured to run the computer program to execute the steps in any one of the method embodiments above.

By the embodiments above of the present disclosure, a DBNG-CP performs UP redundancy capability negotiation with DBNG-UP managed thereby, so as to complete active/standby election of the DBNG-UP, thereby solving the problem of UP redundancy capability negotiation, and increasing the flexibility of DBNG-UP redundancy protection.

BRIEF DESCRIPTION OF THE DRAWING

FIG. 1 is a block diagram of a hardware structure of a computer terminal running a method for DBNG-UP redundancy according to embodiments of the present disclosure;

FIG. 2 is a flowchart of a method for DBNG-UP redundancy according to embodiments of the present disclosure;

DETAILED DESCRIPTION OF THE EMBODIMENTS

Figure 3:
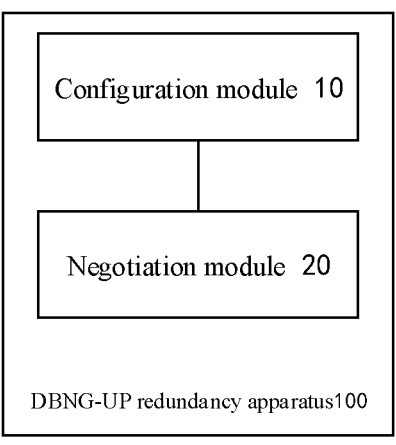
FIG. 3 is a block diagram of an apparatus for DBNG-UP redundancy according to embodiments of the present disclosure.

The embodiments of the present disclosure will be described in detail with reference to the accompanying drawings and in conjunction with the embodiments.

It should be noted that the terms "first", "second" etc., in the description, claims, and accompanying drawings of the present disclosure are used to distinguish similar objects, and are not necessarily used to describe a specific sequence or precedence order.

Method embodiments provided in the present disclosure can be executed in a mobile terminal, a computer terminal, a server or a similar computing apparatus. Taking running on a computer terminal at a network side as an example, FIG. 1 is a block diagram of a hardware structure of a computer terminal running a method for DBNG-UP redundancy according to embodiments of the present disclosure. As shown in FIG. 1, the computer terminal may include one or more (FIG. 1 shows only one) processors 102 (the processors 102 may include, but are not limited to a processing apparatus such as a microprocessor MCU or a programmable logic device FPGA) and a memory 104 configured to store data, wherein the computer terminal can further include a transmission device 106 and an input/output device 108 for communication functions. A person of ordinary skill in the art would understand that the structure shown in FIG. 1 is merely exemplary, and does not limit the structure of the computer terminal. For example, the computer terminal may also include more or fewer assemblies than those shown in FIG. 1, or have different configurations from that shown in FIG. 1.

The memory 104 may be used to store a computer program, for example, a software program and a module of application software, for example, a computer program corresponding to the Disaggregated Broadband Network Gateway-User Plane (DBNG-UP) redundancy method in embodiments of the present disclosure. The processor 102 executes various functional applications and data processing by running the computer program stored in the memory 104, i.e. implementing the described method. The memory 104 may include a high-speed random access memory, and may also include a non-transitory memory, such as one or more magnetic storage apparatuses, flash memories or other non-transitory solid-status memories. In some instances, the memory 104 may further include memories remotely arranged with respect to the processor 102, and these remote memories may be connected to the computer terminal via a network. Examples of the network include, but are not limited to the Internet, an intranet, a local area network, a mobile communication network and a combination thereof.

The transmission apparatus 106 is configured to receive or send data via a network. Specific examples of the network may include a wireless network provided by a communication provider of the computer terminal. In one example, the transmission apparatus 106 includes a Network Interface Controller (NIC) which may be connected to other network devices by means of a base station, thereby being able to communicate with the Internet. In one example, the transmission apparatus 106 may be a Radio Frequency (RF) module which is configured to communicate with the Internet in a wireless manner.

This embodiment provides a method for DBNG-UP redundancy. FIG. 2 is a flowchart of a method for DBNG-UP redundancy according to embodiments of the present disclosure. As shown in FIG. 2, the method includes the following steps:

step S202: a redundancy group instance is configured on a DBNG-CP, wherein redundancy group members managed by the DBNG-CP at least include a first DBNG-UP and a second DBNG-UP;

step S204: the DBNG-CP performs UP redundancy capability negotiation with the first DBNG-UP and the second DBNG-UP respectively, to complete active/standby election between the first DBNG-UP and the second DBNG-UP.

In this embodiment, by the steps above, the DBNG-CP and the DBNG-UPs perform UP Redundancy capability negotiation, for active/standby election on UP Redundancy instances.

In step S202 of this embodiment, a redundancy group instance is configured on the DBNG-CP, a first DBNG-UP and a second DBNG-UP in redundancy group members are specified, and the redundancy capabilities are enabled.

In step S202 of this embodiment, redundancy instances can be deployed on corresponding DBNG-UPs, interfaces connecting the UPs and user access side are added, and the Redundancy capability is enabled.

In step S204 of this embodiment, Redundancy capability negotiation between the DBNG-CP and the DBNG-UPs can be performed by a control plane interface protocol. And active/standby specifying on the DBNG-UPs by the DBNG-CP is completed.

In step S204 of this embodiment, the UP Redundancy capability can be supported by extension of the control plane interface protocol between the DBNG-CP and the DBNG-UPs. The active/standby specifying of the DBNG-UPs by the DBNG-CP needs to be supported by extension of the control plane interface protocol between the DBNG-CP and the DBNG-UPs.

After step S204 in this embodiment, the method can further include: when a user plane interface failure occurs in the active DBNG-UP, the DBNG-UP notifies failure information, carries the failure information and reports same to the DBNG-CP, and the DBNG-CP performs protection switching according to a preconfigured UP Redundancy algorithm mechanism, and notifies a new active DBNG-UP to be switched to an active UP.

In this embodiment, the user plane interface failure may include a physical interface failure and a logical interface failure.

In this embodiment, the active/standby specifying of the DBNG-UPs needs to be supported by extension of the control plane interface protocol between the DBNG-CP and the DBNG-UPs.

In this embodiment, the DBNG-UP needs to notify destination nodes of an access side and a network side thereof, and sets the new active DBNG-UP as a next hop of a route, to achieve correct guide of user traffic.

In this embodiment, the UP Redundancy capability negotiation may be achieved on the basis of a PFCP, for example, a PFCP Association message may be used to achieve UP Redundancy capability notification between the DBNG-CP and the DBNG-UPs.

In this embodiment, a PFCP Node Report implementation mechanism may be used to achieve UP failure detection and a protection group switching process. For example, failure detection information of the DBNG-UPs and protection group switching notification are carried by using a PFCP Node Report Request and PFCP Node Report Response mechanism.

In this embodiment, an information element (IE) of the PFCP Node Report Request message can be extended, and is mainly used for a DBNG-UP failure point report request. The IE may be a newly added Fixed Redundancy IE, or extension of an existing IE.

In this embodiment, an IE of the PFCP Node Report Response message can be extended, for active/standby status notification of the new active DBNG-UP. The IE may be a newly added Fixed Redundancy IE or extension of an existing IE.

In order to ensure the operational reliability of the DBNG-UPs, the embodiments of the present disclosure provide: content that needs to be included in PFCP capability negotiation information for communication between the DBNG-CP and the DBNG-UPs when the PFCP is used for redundancy capability negotiation, extension requirements of the protocol, PFCP extension and processing flow of the DBNG-CP and the DBNG-UPs, and IE extension requirements possibly brought about to the PFCP.

It should be noted that this embodiment is not limited to the PFCP, and no matter which protocol is used for a control interface, IE type and TLV encapsulation information provided are universal.

From the description of the embodiments above, a person skilled in the art would have been able to clearly understand that the method in the embodiments above may be implemented by using software and necessary general hardware platforms, and of course may also be implemented using hardware, but in many cases, the former is a better embodiment. On the basis of such understanding, the portion of the technical solution of the present disclosure that contributes in essence or contributes to the related art may be embodied in the form of a software product. The computer software product is stored in a storage medium (such as an ROM/RAM, a magnetic disk and an optical disc), and includes several instructions for enabling a terminal device (which may be a mobile phone, a computer, a server, or a network device, etc.) to perform the method as described in various embodiments of the present disclosure.

The present disclosure further provides an apparatus for DBNG-UP redundancy, the apparatus is configured to implement the described embodiments and preferred embodiments, and what has been described will not be repeated again. As used below, the term "module" may implement a combination of software and/or hardware of predetermined functions. Although the apparatus described in the following embodiments is preferably implemented in software, implementation in hardware or a combination of software and hardware is also possible and could have been conceived.

FIG. 3 is a block diagram of an apparatus for DBNG-UP redundancy 100 according to embodiments of the present disclosure. As shown in FIG. 3, the apparatus includes a configuration module 10 and a negotiation module 20.

The configuration module 10 is configured to configure a redundancy group instance on a DBNG-CP, wherein redundancy group members managed by the DBNG-CP at least include a first DBNG-UP and a second DBNG-UP;

The negotiation module 20 is configured to perform, by the DBNG-CP, UP redundancy capability negotiation with the first DBNG-UP and the second DBNG-UP respectively, to complete active/standby election between the first DBNG-UP and the second DBNG-UP.

In another embodiment of the present disclosure, in addition to the configuration module and the negotiation module above, the DBNG-UP redundancy apparatus can further include a mapping module, wherein the mapping module is configured to establish, on the DBNG-CP, a mapping from protection interfaces of the first DBNG-UP and the second DBNG-UP to the DBNG-CP.

It should be noted that the described modules may be implemented by software or hardware. The latter may be implemented in the following manner, but is not limited thereto: all the modules are located in the same processor; or all the modules are located in different processors in any arbitrary combination manner.

To facilitate understanding of the technical solutions provided in some embodiments of the present disclosure, hereinafter, detailed description is made with reference to specific scenario embodiments.

It should be noted that in the embodiments of the present disclosure, extension illustration is made on the control interface between the DBNG-CP and the DBNG-UPs by using the PFCP as an example. However, the present disclosure is not limited to the PFCP, and no matter which protocol is used for the control interface, information element (IE) type and TLV (Type Length Value) encapsulation information provided can be universal.

Embodiment 1

Figure 4:
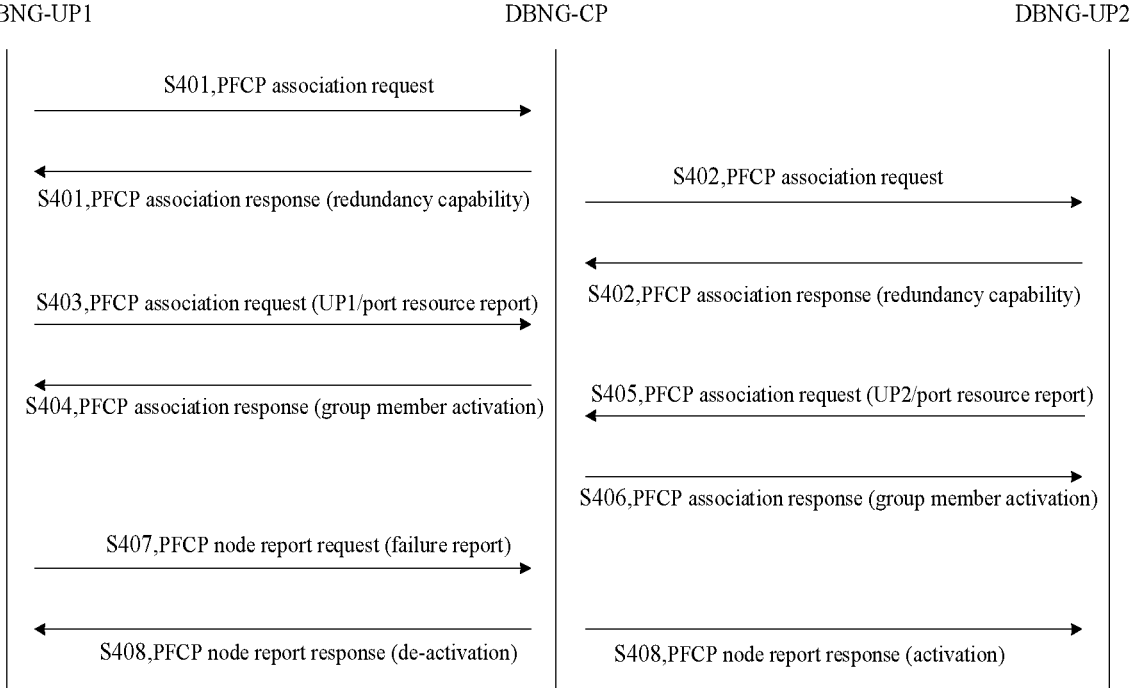
FIG. 4 is a schematic diagram of a processing mechanism for DBNG-UP redundancy according to embodiments of the present disclosure.

In this embodiment, an UP Redundancy processing mechanism is provided. FIG. 4 is a schematic diagram of an UP redundancy processing mechanism according to embodiments of the present disclosure. In this embodiment, the control plane interface between the DBNG-CP and the DBNG-UPs uses the PFCP; as for support of the UP Redundancy function, a PFCP Node Report mechanism is used to achieve active/standby status notification of an UP Redundancy Group; and failure information of the UPs is reported by PFCP Node Report and the DBNG-CP performs status notification after switching of the UP Redundancy group according to the received failure information. As shown in FIG. 4, the processing mechanism includes the following steps:

Step S401: a DBNG-UP1 and a DBNG-CP complete PFCP Redundancy capability negotiation, and use a PFCP Association Request message and a PFCP Association Response message for achieving carrying.

Step S402: a DBNG-UP2 and the DBNG-CP complete PFCP Redundancy capability negotiation, and use a PFCP Association Request message and a PFCP Association Response message for achieving carrying.

Step S403: an active UP member, i.e. the DBNG-UP1 notifies status information (such as port resource information) of a protection group member to the DBNG-CP by a PFCP Node Report Request.

Step S404: the DBNG-CP replies PFCP Node Report Response information, and notifies the status information (such as active) of the protection group member to the DBNG-UP1.

Step S405: a standby UP member, i.e. the DBNG-UP2 notifies the status information (such as port resource information) of the protection group member to the DBNG-CP by a PFCP Node Report Request.

Step S406: the DBNG-CP replies a PFCP Node Report Response message, and notifies the status information (e.g. standby) of the protection group member to the DBNG-UP2.

Step S407: when a port or UP1 instance fails in the active UP member, i.e. the DBNG-UP1, failure status information is reported to the DBNG-CP by PFCP Node Report Request information.

Step S408: the DBNG-CP triggers protection switching according to the received failure information, and notifies, by replying the PFCP Node Report Response message, the DBNG-UP2 that the status of the protection group member is switched to active, and at the same time, notifies the DBNG-UP2 that the status of the protection group member is switched to active UP members.

Embodiment 2

In this embodiment, according to the description in Chapter 7.4.5 of 3GPP TS29.244, a PFCP Node Report includes two packet types: a PFCP Node Report Request and a PFCP Node Report Response. The PFCP Node Report Request contains an Alternative SMF IP address IE for specifying an SMF redundancy address; an SMF of a 3GPP core network is a control plane network function of a UPF; the UPF is a user plane network function and corresponds to a fixed network; the DBNG-CP is a DBNG control plane network function; and the DBNG-UP is a DBNG user plane network function.

However, 3GPP TS29.244 has no redundancy protection support for the user plane network function (UPF). In this disclosure, in order to realize redundancy protection of the user plane network function DBNG-UP, it is necessary to extend a PFCP for supporting an UP Redundancy function.

In this embodiment, an UP Redundancy Group ID IE is added, and the corresponding IE type thereof is an UP Redundancy Group ID type, as shown in Table 1:

TABLE 1

| Information elements | Condition/Comment | IE Type |
|---|---|---|
| UP Redundancy Group ID | The IE shall contain an unique identifier of the UP redundancy group | UP Redundancy Group ID |

An encapsulation format of the UP Redundancy Group ID IE is as shown in Table 2:

TABLE 2

| Octets | Bits | | | | | | | |
|---|---|---|---|---|---|---|---|---|
| | 8 | 7 | 6 | 5 | 4 | 3 | 2 | 1 |
| 1 to 2 | Type = XXX (decimal) | | | | | | | |
| 3 to 4 | Length = n | | | | | | | |
| 5 | UP Redundancy Group ID | | | | | | | |
| 6 to 7 | UP Redundancy Group Member | | | | | | | |
| 8 to 9 | UP Redundancy Group Type | | | | | | | |
| 10 to 11 | UP Redundancy Group Policy | | | | | | | |

In this embodiment, the IE is used for issuing configuration information of an UP Redundancy protection group, and an encapsulation format thereof is as follows:

Octets 1-2 are used for encapsulation of IE type information, and the IE type information is an UP Redundancy Group ID IE.

Octets 3-4 are used for encapsulation of IE field length information.

Octet 5 is used for encapsulation of UP redundancy group ID information, which characterizes information such as name or identifier of a Group. Octets 6-7 are used for encapsulation of UP Redundancy Group Member information, including name or identifier (ID) of a user-side physical interface of a CP, or name or identifier of a virtual interface, etc.

Further, in this embodiment, a group member of the UP Redundancy Group is a node identifier (node-id) and a node name (node-name), etc. of each UP, and is based on UP granularity.

Octets 8-9 are used for encapsulation of UP Redundancy Group Type information and are used for describing hot standby, cold standby, warm standby, etc.

Octets 10-11 are used for encapsulation of UP Redundancy Group Policy information, and are used for describing a CP switchover policy, such as a priority and a switching policy.

Embodiment 3

This embodiment relates to mapping processing of an UP Redundancy group of a DBNG-CP and protection ports of member DBNG-UPs. In this embodiment, N+1 UPs (DBNG-UP1, DBNG-UP2, . . . , DBNG-UPn, and DBNG-UP(n+1)) are configured on the DBNG-UP in the same redundancy group instance.

Figure 5:
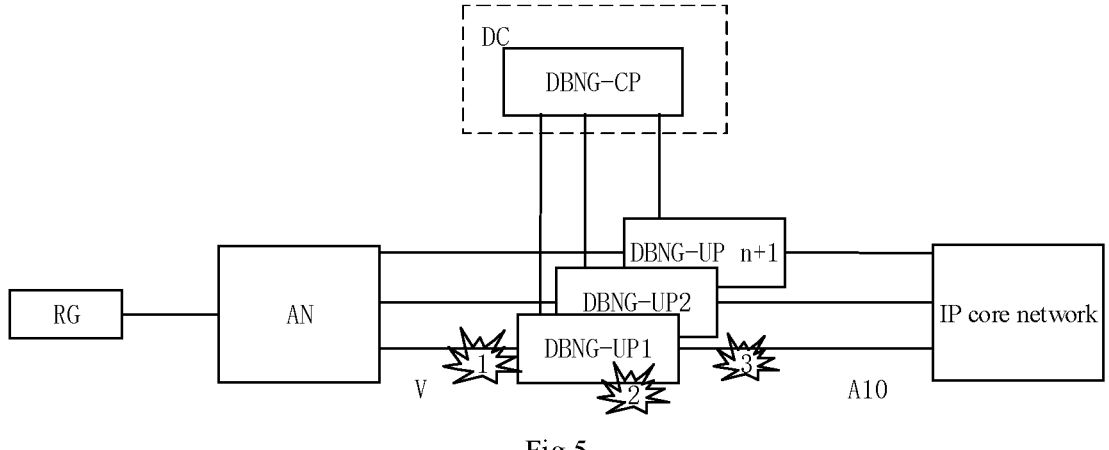
FIG. 5 is a schematic diagram of user plane interface failure points according to embodiments of the present disclosure.

FIG. 5 is a schematic diagram of failure points, which identify failure points 1, 2, and 3. A real switching operation occurring during Redundancy protection of the DBNG-UPs is in the DBNG-CP, but failure detection points (as shown in FIG. 5) are on interfaces between the DBNG-UPs and a user access side.

When failure detection and UP Redundancy deployment are performed, this embodiment may include the following steps:

Step 1, an UP Redundancy Group is configured on a DBNG-CP, Group ID information is specified, a Group member is added to point to a DBNG-UP managed by the group member, and a priority thereof is configured.

Step 2, a protection group is configured on the DBNG-UP, and a user side interface thereof is added to the protection group.

Step 3, the DBNG-UP needs to report interface protection group configuration of the UP to the DBNG-CP by a control plane interface protocol between the DBNG-CP and the DBNG-UP.

Step 4, an interface (port) mapping relationship between the UP Redundancy Group and corresponding DBNG-UPs thereof is established on the DBNG-CP.

Step 5, upon detection failure of an active DBNG-UP, failure information of the user side interface of the UP is reported to the DBNG-CP by the control plane interface protocol between the DBNG-CP and the DBNG-UP.

Step 6, the DBNG-CP triggers switching of the UP Redundancy Group, and notifies a new DBNG-UP as an active UP (active).

Embodiment 4

This embodiment relates to PFCP extension supporting a mapping manner from UP ports to a UP Redundancy Group. In Step S403 and Step S404 of Embodiment 1, the DBNG-UP1 needs to add the DBNG-UP1 into UP Redundancy group information configured by the DBNG-CP, and sends same to the DBNG-CP1 by the PFCP Node Report Request. This information can be uploaded to the DBNG-CP by carrying redundancy group instance information configured on the DBNG-UP, and a mapping relationship between the UP Redundancy Group (configuring UP members on the CP) and redundancy group instance members of the UP (configuring Port members on the UP) is achieved on the DBNG-CP, i.e. port->UP node-id->UP Redundancy Group ID.

In this embodiment, a mapping relationship between port->UP node-id->UP Redundancy Group ID is formed on the DBNG-CP to extend PFCP implementation.

Embodiment 5

This embodiment relates to carrying UP failure information by extending PFCP Node Report Request. The 3GPP PFCP has a User Plane Path Failure IE type for providing failure detection of a user network function, but the IE only has a GTP-U Peer IE type. In this embodiment, in order to support a control interface protocol of a fixed network side DBNG, it is necessary to extend accessibility detection of a newly added fixed network access side routing protocol. For example, Ethernet and IP route detection are added.

In this embodiment, a Logical Port IE is used to perform detection of physical port or logical port status and IP accessibility detection, etc. The description of the Logical Port IE is as shown in Table 3:

TABLE 3

| Information elements | Condition/Comment | IE Type |
|---|---|---|
| Logical Port | The IE shall include a logical interface status and an IP address which point to a remote access node at which user plane interface failure has been detected | Logical Port |

In this embodiment, User Plane Path Failure IE, type=102 is extended, and a Logical Port IE is newly added. Table 4 shows user plane failure IE information:

TABLE 4

| Octets | Bits | | | | | | | |
|---|---|---|---|---|---|---|---|---|
| | 8 | 7 | 6 | 5 | 4 | 3 | 2 | 1 |
| 1 to 2 | Type = 102 (decimal) | | | | | | | |
| 3 to 4 | Length = n | | | | | | | |
| 5 | Remote GTP-U Peer | | | | | | | |
| 6 to 7 | Logical Port | | | | | | | |

Since BBF TR-459 has defined the Logical Port IE, this structure can be multiplexed in this embodiment without extension.

Embodiment 6

This embodiment relates to the problem that extension of PFCP Node Report Response carries active/standby enable of an UP Redundancy group. Refer to step S408 in Embodiment I, the DBNG-UP1 reports user side port failure information thereof to the DBNG-CP, and the DBNG-CP triggers switching of the UP Redundancy Group according to the received failure information and set algorithm mechanism for UP Redundancy Group switching, and notifies that the DBNG-UP2 is an active UP.

In this embodiment, a newly added UP Redundancy Active IE is proposed, and Table 5 shows extended IE information of Node Report Response.

TABLE 5

| Information elements | Condition/Comment | IE Type |
|---|---|---|
| UP Redundancy Active | When the UP Redundancy Active IE indicates whether the UP is in an active or a standby status, the IE is used | UP Redundancy Active |

Table 6 below shows encapsulation of the UP Redundancy Active IE.

TABLE 6

| | | | | Bits | | | | |
|---|---|---|---|---|---|---|---|---|
| Octets | 8 | 7 | 6 | 5 | 4 | 3 | 2 | 1 |
| 1 to 2 | | | | Type = XXX (decimal) | | | | |
| 3 to 4 | | | | Length = n | | | | |
| 5 | SPARE | SPARE | SPARE | SPARE | SPARE | SPARE | SPARE | Activate |
| 6 to (n + 4) | | | These octet(s) is/are present only if explicitly specified | | | | | |

Octet 5: active/standby status of an encapsulated Redundancy Group.

Bit 1-Activate: If this bit is set as "1", it indicates that an issued protection group member is active; if this bit is set as "0", it indicates that the protection group member is standby.

In this embodiment, the member herein is a UP Redundancy Group member, which refers to corresponding UP Node ID information.

Bit 2 to 8 are spare, the default is set to "0", for future use.

In this embodiment, unlike SMF active/standby in 3GPP TS29.244 being static configuration, active/standby of the DBNG-UPs is dynamically elected on the DBNG-CP; therefore, after the active/standby status election is completed, the DBNG-CP needs to achieve carrying by PFCP IE information and sends same to a corresponding Redundancy member, i.e. DBNG-UP.

Embodiments of the present disclosure further provide a computer-readable storage medium, the computer-readable storage medium storing a computer program, wherein the computer program is configured to execute, when running, the steps in any one of the method embodiments above.

In some exemplary embodiments, the computer readable storage medium may include, but is not limited to: any medium that can store a computer program, such as a USB flash drive, a Read Only Memory (ROM), a Random Access Memory (RAM), a removable hard disk, a magnetic disk, or an optical disc.

Embodiments of the present disclosure further provide an electronic apparatus, including a memory and a processor; wherein the memory stores a computer program, and the processor is configured to run the computer program to execute the steps in any one of the method embodiments above.

In an exemplary embodiment, the electronic apparatus can further include a transmission device and an input/output device, wherein the transmission device is connected to the processor, and the input/output device is connected to the processor.

For specific examples in the present embodiment, reference can be made to the examples described in the embodiments and exemplary embodiments, and thus they will not be repeated again in the present embodiment.

It is apparent that a person skilled in the art shall understand that all of the modules or steps in the present disclosure may be implemented by using a general computing apparatus, may be centralized on a single computing apparatus or may be distributed on a network composed of multiple computing apparatuses.

The modules or steps may be implemented by using executable program codes of the computing apparatus, and thus, the program codes may be stored in a storage apparatus and executed by the computing apparatus, and in some cases, the shown or described steps may be executed in a sequence different from that shown herein, or the modules or steps are manufactured into integrated circuit modules, or multiple modules or steps therein are manufactured into a single integrated circuit module for implementation. Thus, the present disclosure is not limited to any specific hardware and software combinations.

The content above only relates to preferred embodiments of the present disclosure and is not intended to limit the present disclosure. For a person skilled in the art, the present disclosure may have various modifications and variations. Any modifications, equivalent replacements, improvements, etc. made within the spirit and principle of the present disclosure shall all fall within the scope of protection of the present disclosure.

What is claimed is:

1. A method for Disaggregated Broadband Network Gateway-User Plane (DBNG-UP) redundancy, comprising:

configuring a redundancy group instance on a Disaggregated Broadband Network Gateway-Control Plane (DBNG-CP), wherein redundancy group members managed by the DBNG-CP at least comprise a first DBNG-UP and a second DBNG-UP;

performing, by the DBNG-CP, UP redundancy capability negotiation with the first DBNG-UP and the second DBNG-UP respectively, and performing active/standby specifying of the first DBNG-UP and the second DBNG-UP, wherein an UP redundancy group identifier information element is added to a Packet Forwarding Control Protocol (PFCP) association message to support the UP redundancy capability negotiation and the active/standby specifying; and in response to a user plane interface failure occurring in the first DBNG-UP, receiving, by the DBNG-CP, failure information reported by the first DBNG-UP, triggering protection switching of redundancy group members, and notifying status information of the redundancy group members, wherein an information element of a PFCP node report request message is extended to carry the failure information reported by the first DBNG-UP, and an information element of a PFCP node report response message is extended to carry the status information of the redundancy group members.

2. The method according to claim 1, wherein configuring a redundancy group instance on a DBNG-CP comprises:

configuring the redundancy group instance on the DBNG-CP, and specifying the first DBNG-UP and the second DBNG-UP as the redundancy group members; and deploying redundancy instances on the first DBNG-UP and the second DBNG-UP respectively, adding interfaces connecting the first DBNG-UP and the second DBNG-UP to a user access side, and enabling redundancy capabilities of the first DBNG-UP and the second DBNG-UP.

3. The method according to claim 1, wherein the first DBNG-UP is an active DBNG-UP and the second DBNG-UP is a standby DBNG-UP.

4. The method according to claim 1, wherein extending an information element of a PFCP node report request message to carry the failure information reported by the first DBNG-UP comprises:

carrying the failure information of the first DBNG-UP by an extended user plane interface failure information element.

5. The method according to claim 1, wherein extending an information element of a PFCP node report response message to carry the status information of the redundancy group members comprises:

carrying the status information of the redundancy group members by a newly-added user plane redundancy group member status information element.

6. A non-transitory computer readable storage medium, the computer readable storage medium storing a computer program, wherein the computer program is configured to, when executed by a processor, implement the steps of the method according to claim 1.

7. An apparatus for Disaggregated Broadband Network Gateway-User Plane (DBNG-UP) redundancy, wherein the apparatus comprises a hardware processor configured to:

configure a redundancy group instance on a Disaggregated Broadband Network Gateway-Control Plane (DBNG-CP), wherein redundancy group members managed by the DBNG-CP at least comprise a first DBNG-UP and a second DBNG-UP;

perform, by the DBNG-CP, UP redundancy capability negotiation with the first DBNG-UP and the second DBNG-UP respectively, and perform active/standby specifying on the first DBNG-UP and the second DBNG-UP, wherein an UP redundancy group identifier information element is added to a Packet Forwarding Control Protocol (PFCP) association message to support the UP redundancy capability negotiation and the active/standby specifying; and in response to a user plane interface failure occurring in the first DBNG-UP, receive by the DBNG-CP, failure information reported by the first DBNG-UP, trigger protection switching of redundancy group members and notify status information of the redundancy group members, wherein an information element of a PFCP node report request message is extended to carry the failure information reported by the first DBNG-UP, and an information element of a PFCP node report response message is extended to carry the status information of the redundancy group members.

8. The apparatus according to claim 7, the hardware processor further configured to:

establish, on the DBNG-CP, a mapping from protection interfaces of the first DBNG-UP and the second DBNG-UP to the DBNG-CP.

9. An electronic apparatus, comprising a memory, a processor, and a computer program which is stored on the memory and is executable by the processor, the processor is configured to execute the computer program to:

configure a redundancy group instance on a Disaggregated Broadband Network Gateway-Control Plane (DBNG-CP), wherein redundancy group members managed by the DBNG-CP at least comprise a first DBNG-UP and a second DBNG-UP;

perform, by the DBNG-CP, UP redundancy capability negotiation with the first DBNG-UP and the second DBNG-UP respectively, and perform active/standby specifying on the first DBNG-UP and the second DBNG-UP, wherein an UP redundancy group identifier information element is added to a Packet Forwarding Control Protocol (PFCP) association message to support the UP redundancy capability negotiation and the active/standby specifying; and in response to a user plane interface failure occurring in the first DBNG-UP, receive, by the DBNG-CP, failure information reported by the first DBNG-UP, trigger protection switching of redundancy group members, and notify status information of the redundancy group members, wherein an information element of a PFCP node report request message is extended to carry the failure information reported by the first DBNG-UP, and an information element of a PFCP node report response message is extended to carry the status information of the redundancy group members.

10. The electronic apparatus according to claim 9, the processor is further configured to execute the computer program to:

configure the redundancy group instance on the DBNG-CP, and specifying the first DBNG-UP and the second DBNG-UP as the redundancy group members; and deploy redundancy instances on the first DBNG-UP and the second DBNG-UP respectively, adding interfaces connecting the first DBNG-UP and the second DBNG-UP to a user access side, and enabling redundancy capabilities of the first DBNG-UP and the second DBNG-UP.

* * * * *